United States Patent [19]

Fidock

[11] 4,413,381

[45] Nov. 8, 1983

[54] METHOD OF RETRIEVING AND SECURING ANCHORS, FISH TRAPS AND LOBSTER POTS

[76] Inventor: Robert J. Fidock, 49 Fourth St., Boolaroo, New South Wales, Australia

[21] Appl. No.: 283,670

[22] Filed: Jul. 15, 1981

[30] Foreign Application Priority Data

Oct. 30, 1980 [AU] Australia .............................. PE6277

[51] Int. Cl.³ ............................................. F16G 11/00
[52] U.S. Cl. ................................................... 24/131 C
[58] Field of Search ......................... 24/131 C, 131 R; 116/294

[56] References Cited

U.S. PATENT DOCUMENTS

| | | | |
|---|---|---|---|
| 2,478,184 | 8/1949 | Elliot | 24/131 C |
| 3,055,332 | 9/1962 | Linsdeau | 24/131 C |
| 4,236,282 | 12/1980 | Harvey, Jr. | 24/131 C |

*Primary Examiner*—Jay N. Eskovitz
*Attorney, Agent, or Firm*—Michael J. Striker

[57] ABSTRACT

A device to aid in the retrieval of anchors, lobster pots, fish traps and the like from the sea-bed. The device comprises connecting means to connect the device to a float, the connecting means being positioned between guide means, designed to guide a rope connected to the anchor, or like article and retaining means, through which the rope passes as it is raised and which serves to engage with an obstruction on the rope when the anchor is raised to the surface of the sea. The device may be formed integrally from a single piece of stainless steel rod.

5 Claims, 4 Drawing Figures

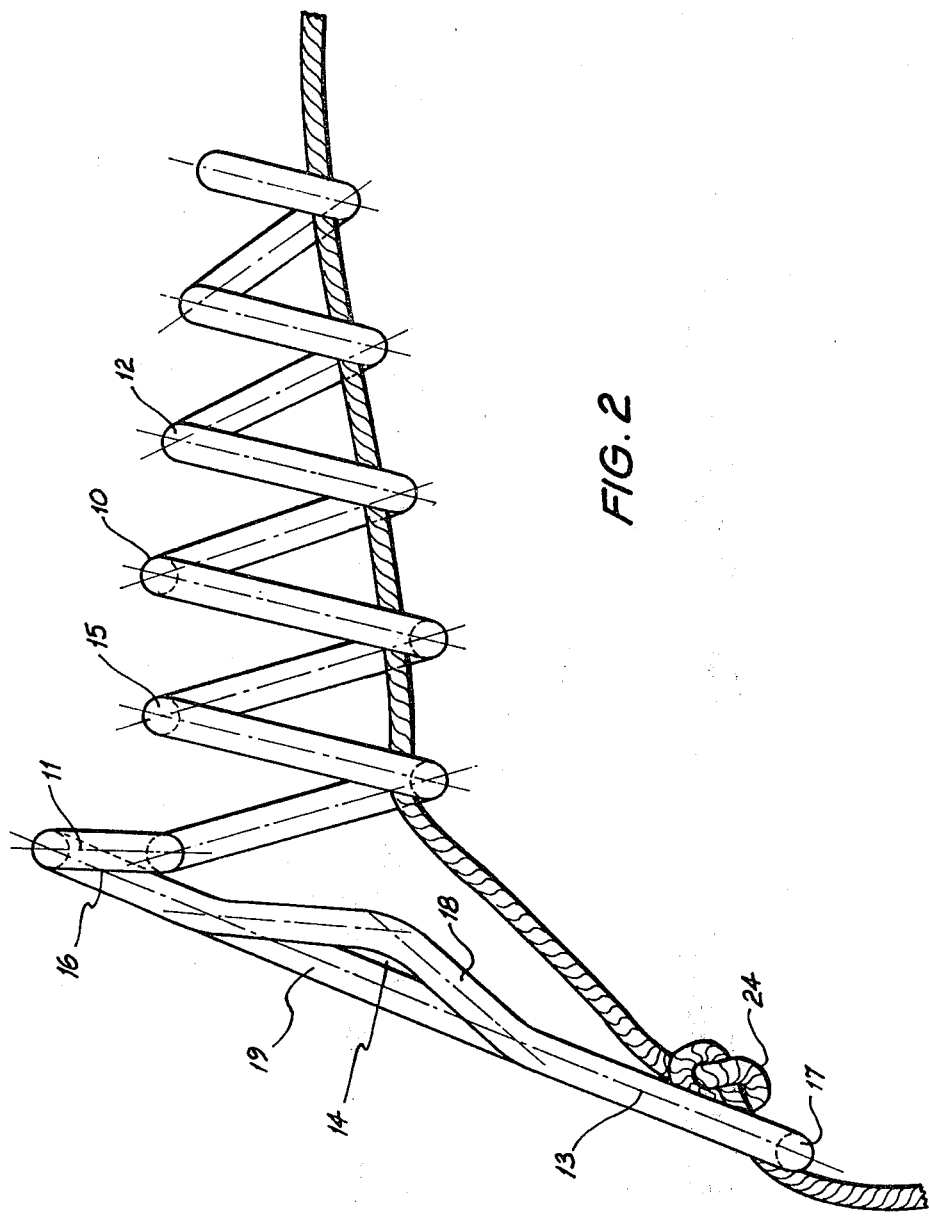

METHOD OF RETRIEVING AND SECURING ANCHORS, FISH TRAPS AND LOBSTER POTS

The present invention relates to a device to aid in the retrieval of anchors, fish traps, lobster pots and like articles from the sea-bed and more particularly to such a device which, when connected to a suitable float, will retain the anchor or the like article adjacent the water surface from whence it may be readily lifted into a boat the motive power of which has been used to raise the article.

Conventionally anchors and like articles such as fish traps and lobster pots are either raised manually by hauling in a rope or chain hand-over-hand or they are raised by passing the rope or chain around a capstan which may be manually operated or operated by a motor. The manual raising of anchors can be physically difficult and can be time consuming if the anchor is at a great depth. The use of a capstan can at least in part solve the above problems, however, such capstans are very expensive and some smaller craft are not suitable to have a capstan mounted on the foredeck. The present invention provides a simple device which can be used in conjunction with a float and the motive power of the boat to raise an anchor or the like quickly without great physical effort, and retain the anchor or the like close to the water surface to allow it to be easily lifted into the boat.

The present invention consists in a device to aid in the retrieval of anchors and like articles from the bottom of a body of water, comprising guide means defining an aperture through which a rope or chain connected to the anchor or like article may pass, connection means adapted to allow the device to be connected to floatation means, and retaining means so disposed relative to the guide means that in use the rope or chain will run through the retaining means as the rope or chain is drawn in, the retaining means including engagement means adapted to engage the rope or chain at a predetermined point along its length and to prevent the rope or chain being paid out past the retaining means.

In another aspect the present invention consists in a device to aid in the retrieval of anchors and like articles from the bottom of a body of water, comprising guide means having an aperture through which a rope or chain connected to the anchor or like article may pass, connection means adapted to allow the device to be connected to floatation means, and retaining means defining an upwardly opening generally V-shaped slot through which the rope or chain may run before passing through the guide means as the rope or chain is drawn in, the retaining means being so disposed relative to the guide means that in use a knot or other obstruction on the rope, or individual links of a chain, may ride upwardly through the V-shaped slot as the rope or chain is drawn in under tension but will engage behind the slot if the tension in the rope or chain is subsequently released.

The device is preferably formed from a material which is substantially impervious to degradation through immersion in salt water. The most suitable materials are therefore galvanised mild steel, stainless steel and some plastics materials. The device is preferably formed integrally by metal fabrication techniques or by injection moulding of a plastics material. Most preferably the device is wound up from stainless steel rod stock.

The guide means may be a simple loop or tube through which the anchor warp or chain may be threaded through the aperture therein from its end. It is, however, preferable to form the guide means so that the anchor warp or chain may be introduced into the aperture of the guide means at any point along the length of the rope. For this purpose the guide means may comprise a snap shackle or the like. The most preferred form of guide means is an open ended spiral of wire or the like. In this construction the coils of the spiral define the aperture in the guide means and the anchor warp or chain may be introduced into the spiral by winding the rope or chain around the outside of the spiral following the helical path between adjacent coils of the spiral.

The connecting means is preferably an eye through which a shackle may be passed to shackle the anchor retrieval device to a suitable floatation means. If desired a snap shackle or the like could be formed integrally with the device. In a further embodiment the guide means and the connecting means could be formed as a single part capable of fulfilling both functions. It will be recognised that the device according to this invention should be used in conjunction with floatation means which has a lifting capacity sufficient to support the anchor and chain being used.

The retaining means preferably includes a V-shaped slot to act as the engagement means and behind which an obstruction on the rope or a link of a chain may jam to retain the anchor in its raised position. The retaining means may be a plate or tube from which a V-shaped slot has been cut or it may be formed from rod stock which serves to define a V-shaped slot. Obviously the size and exact configuration of the V-shaped slot should be adapted to the size and shape of the obstruction on the rope or the size of the chain links. The obstruction on the rope is preferably a single overhand or figure-of-eight knot. The V-shaped slot preferably has a first portion adjacent its base in which the angle between the edges of the slot is less than in a second portion more remote from the base. This facilitates the obstruction in the rope or chain riding up the slot until it can pass through the V-shaped slot as the rope is being drawn in yet traps the obstruction as the rope is paid out. The plane in which the V-shaped slot lies should be inclined to the direction of movement of the rope or chain through the guide means by an angle of greater than 90° as this also facilitates the obstruction riding up through the slot as the rope or chain is drawn in.

In an alternative embodiment the retaining means may include engagement means in the form of a cam or cams or other jamming means which are activated to engage the rope at a predetermined point along its length.

In use if a motor boat user wishes to retrieve his anchor he has only to pass the anchor rope or chain through the retaining means and the guide means of the device and connect it to a suitable float. He then drives his boat away from the float. As the boat is driven away the float stays relatively stationary and the rope or chain is drawn up through the retaining means and the guide means. When the rope or chain has been fully drawn up the anchor or an obstruction on the rope or chain will engage against the guide means and the float will be drawn along behind the boat at the same speed as the boat. This alerts the boat operator that the anchor is raised and he can stop the boat which releases the tension in the rope or chain. The anchor will then begin to descend again until the obstruction, or a chain link, engages with the engagement means. The anchor is then suspended from the device. The boat may then be driven back to the float and the anchor rope or chain wound in manually as the boat approaches the float. Upon reaching the float the device according to this invention, and the anchor may be lifted aboard the boat.

The present invention may be used on a wide variety of boats. It is, however, of particular applicability to small boats, say between 12 and 25 feet, used for fishing in very deep water, say greater than 100 feet. In these circumstances the anchor will normally be connected to the boat through a short length of chain and a long length of a rope of a synthetic plastics material such as polypropylene.

Hereinafter given by way of example only is a preferred embodiment of the present invention described with reference to the accompanying drawings in which:

FIG. 2 is a side elevational view of the device of FIG. 1 showing a knot in an anchor rope engaged behind the retaining means.

Figure 1:
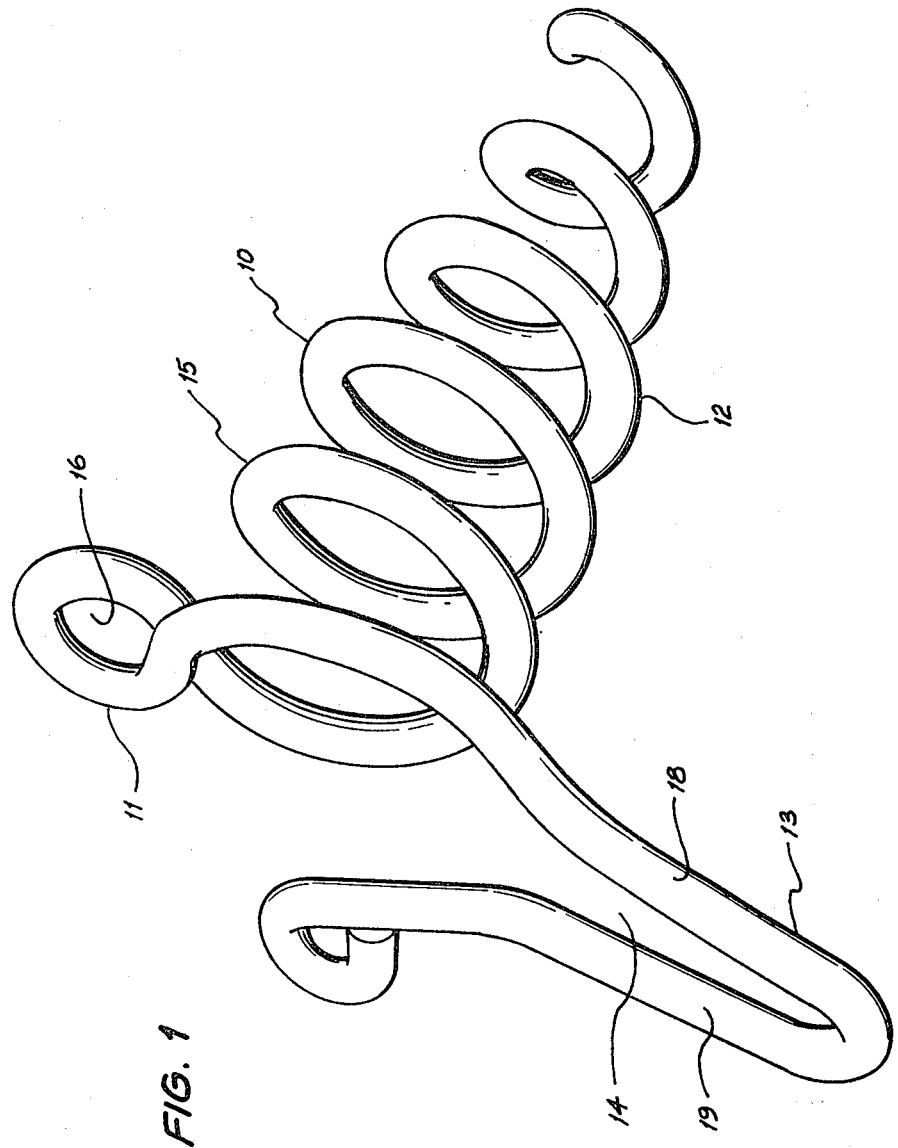
FIG. 1 is a perspective view of a device according to the present invention.

The anchor retrieving device 10 comprises connecting means 11, for connecting the device 10 to a float, a guide means 12 to guide an anchor rope and a retaining means 13 defining a V-shaped slot 14 which acts to engage with a knot on the rope (as seen diagramatically in FIG. 2) or with a link of a length of chain connecting the rope to the anchor.

The device is wound up from a single length of stainless steel rod stock 15 which simplifies its fabrication.

The connecting means 10 comprises a loop of the rod intermediate its length. The eye 16 formed by the loop of rod 15 may be connected to a suitable float 21 (see FIGS. 3A and 3B) by a conventional shackle (not shown). On one side of the connecting means 11 the rod 15 becomes the retaining means 13 and on the other the guide means 12. The guide means 12 comprises an open ended spiral of the rod 15 which spiral decreases in size away from the connecting means 11.

The retaining means 13 comprises a V-shaped length of the rod 15 which defines between its diverging arms the V-shaped slot 14. The retaining means lies in a plane disposed at an angle of some 100° to the longitudinal axis of the portion of the rope passing through the guide means 12. Immediately adjacent the bight 17 of the retaining means 13 the arms 18 and 19 thereof diverge at an angle of approximately 16°. The arm 18 joining the connecting means 11 to the bight 17 is cranked intermediate its ends while the other arm 19 is angled outwardly. The effect of this is to widen the angle between the arms 18 and 19 to about 26°.

The free end of the arm 19 is curled over to finish the device neatly and to avoid the possibility of a sharp free end causing damage to the boat or the float.

Figure 3A:
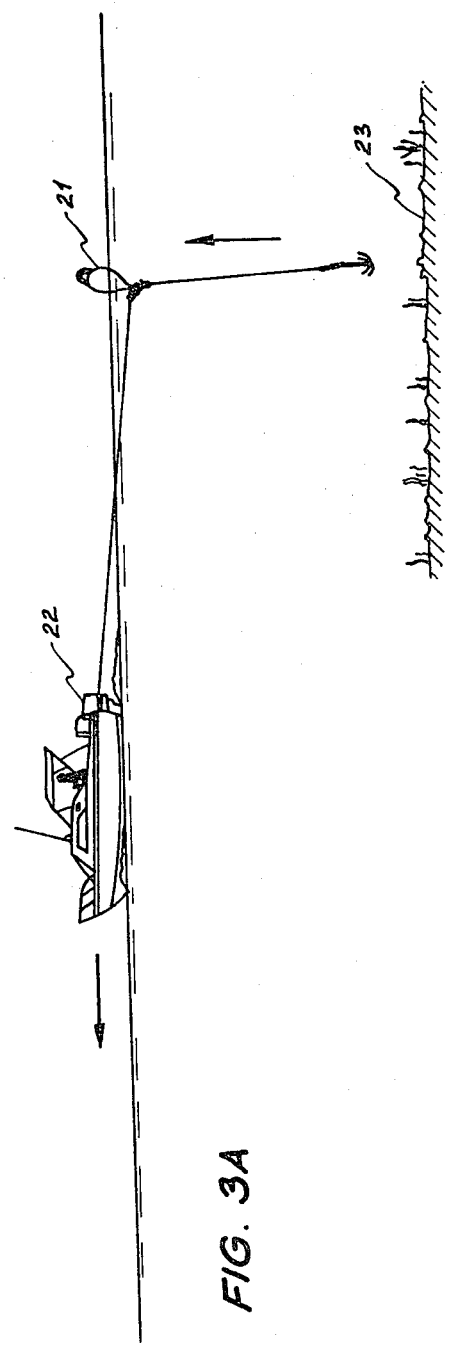
FIGS. 3A and 3B show stages in the recovery of an anchor using the present device.
Figure 3B:
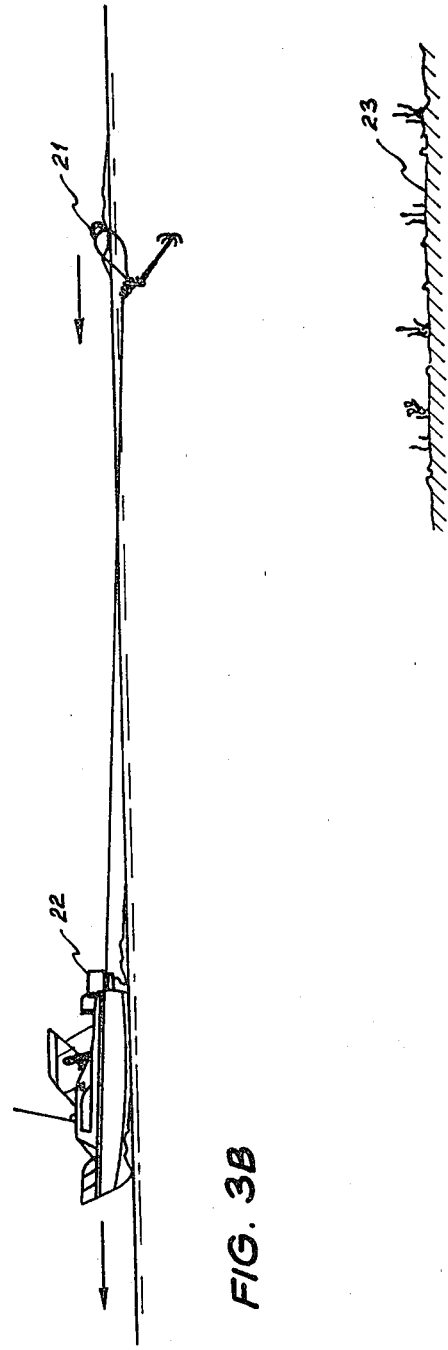

In use an anchor rope is passed upwardly through the V-shaped slot 14 between the arms 18 and 19 of the retaining means 13. It is then introduced into the aperture defined by the guide means 12 by threading the rope through the helical space between adjacent coils of the guide means 12. The eye 11 is shackled to a suitable float and the float and the device according to this invention are dropped into the water. The boat 22 is then driven over the estimated position of the anchor and continues past it as seen in FIG. 3A. The anchor is thus lifted from the sea-bed 23 and rises towards the float. When the knot in the rope or the anchor chain enters the guide means 12 it causes the float to be pulled along behind the boat as seen in FIG. 3B. When this happens the boat can be turned around and driven slowly back to the float as the anchor rope is retrieved. It will be appreciated that this may be done easily as the rope is untensioned the anchor being supported by the float, the knot 24 in the anchor rope, having engaged behind the V-shaped slot as seen in FIG. 2.

I claim:

1. A device to aid in the retrieval of anchors and like articles from the bottom of a body of water, comprising guide means having an aperture through which a rope or chain connected to the anchor or like article may pass freely and without obstruction, connection means adapted to allow the device to be connected to floatation means, and retaining means defining an upwardly opening generally V-shaped slot through which the rope or chain may run before passing through the guide means as the rope or chain is drawn in, the retaining means being so disposed relative to the guide means that in use a knot or other obstruction on the rope or individual links of a chain may ride upwardly through the V-shaped slot as the rope or chain is drawn in under tension but will engage behind the slot if the tension in the rope or chain is subsequently released, said V-shaped slot having a first portion adjacent its base in which the angle between the edges of the slot is less than in a second portion more remote from the base.

2. A device as claimed in claim 1 in which the device is wound up from a single piece of metal rod.

3. A device as claimed in claim 1 in which the guide means comprises an open ended spiral.

4. A device as claimed in claim 1 in which the V-shaped slot of the retaining means lies in a plane disposed at an angle of more than 90° to the direction of movement of the rope through the guide means.

5. A device as claimed in claim 1 in which the connecting means comprises a loop defining an eye through which a shackle may be threaded.

* * * * *